United States Patent [19]
Lauf et al.

[11] Patent Number: 5,184,286
[45] Date of Patent: Feb. 2, 1993

[54] PROCESS FOR MANUFACTURING TANTALUM CAPACITORS

[75] Inventors: Robert J. Lauf, Oak Ridge; Cressie E. Holcombe, Knoxville; Norman L. Dykes, Oak Ridge, all of Tenn.

[73] Assignee: Martin Marietta Energy Systems, Inc., Oak Ridge, Tenn.

[21] Appl. No.: 853,474

[22] Filed: Mar. 18, 1992

[51] Int. Cl.⁵ .............................. H01G 9/05; B22F 1/00
[52] U.S. Cl. ................................... 361/529; 29/25.03; 419/2
[58] Field of Search ............... 361/529, 530; 29/25.03; 419/2, 30, 31; 75/208, 211, 222, 252

[56] References Cited

U.S. PATENT DOCUMENTS

| | | | |
|---|---|---|---|
| 4,041,359 | 8/1977 | Mizushima et al. | 361/529 |
| 4,059,442 | 11/1977 | Bernard | 419/2 |
| 4,214,293 | 7/1980 | Sterling et al. | 361/529 |
| 4,483,819 | 11/1984 | Albrecht | 75/419 |
| 4,810,846 | 3/1989 | Holcombe et al. | 219/10.55 |
| 4,828,961 | 5/1989 | Lau et al. | 430/198 |
| 4,880,578 | 11/1989 | Holcombe et al. | 264/26 |
| 4,938,673 | 7/1990 | Adrian | 419/23 |
| 4,945,452 | 7/1990 | Strummer et al. | 361/29 |
| 5,004,715 | 4/1991 | Hakotani et al. | 501/136 |
| 5,010,443 | 4/1991 | Maber | 361/321 |

Primary Examiner—Donald Griffin
Attorney, Agent, or Firm—George L. Craig; Harold W. Adams

[57] ABSTRACT

A process for manufacturing tantalum capacitors in which microwave energy is used to sinter a tantalum powder compact in order to achieve higher surface area and improved dielectric strength. The process comprises cold pressing tantalum powder with organic binders and lubricants to form a porous compact. After removal of the organics, the tantalum compact is heated to 1300° to 2000° C. by applying microwave radiation. Said compact is then anodized to form a dielectric oxide layer and infiltrated with a conductive material such as $MnO_2$. Wire leads are then attached to form a capacitor to said capacitor is hermetically packaged to form the finished product.

18 Claims, 2 Drawing Sheets

PROCESS FOR MANUFACTURING TANTALUM CAPACITORS

This invention was made with Government support under Contract No. DE-AC05-84OR21400 awarded by the U.S. Department of Energy to Martin Marietta Energy Systems, Inc. The Government has certain rights in this invention.

BACKGROUND OF INVENTION

1. Field of Invention

The present invention relates to devices and methods for processing powder metallurgy components and more particularly to devices and methods for sintering tantalum anodes in the production of tantalum capacitors.

2. Description of Prior Art

In the field of tantalum capacitor manufacturing, it is well known that the capacitance of the finished device is determined by the effective surface area of the tantalum anode and by the thickness of the anodic oxide film that is formed on the tantalum which serves as the dielectric element in the capacitor. The working voltage of the capacitor, as well as its long-term reliability, depend on the continuity and homogeneity of the oxide film. Low quality or non-homogeneous areas of the film can break down under applied charging voltages and cause capacitor failure at a lower voltage than desired.

The tantalum anode is conventionally made by pressing tantalum powder in a die to form a porous compact. This compact is then sintered in vacuum at temperatures from 1500° to 2000° C. to form a strong yet still highly porous body. The sintering process must be controlled carefully to develop adequate mechanical strength in the body and yet avoid excessive reduction in porosity which results in an overly dense anode with diminished surface area and reduced capacitance. Similarly, the use of a high surface-area powder can be counterproductive if the powder is too sinterable causing excessive densification or if it contains traces of undesirable elements such as phosphorus or sulfur that migrate to and collect on the tantalum particle surfaces during the initial sintering process and degrade the quality of the anodic oxide film. For example, tantalum powder made by the sodium reduction process has the highest surface area to allow greater capacitance, but is less pure. Electron beam refined powder has higher purity to allow higher working voltages, but has lower surface area resulting in a lower porosity of the sintered tantalum compact and a subsequently lower capacitance in the finished capacitor. These performance trade offs could be better optimized by a sintering process that concentrates energy at the points where individual tantalum particles come into contact resulting in good mechanical bonding without excessive densification. The successful initiation of a microscopic arc or plasma within the pore spaces of the tantalum compact could improve sintering where the particles contact yielding a better balance of densification versus porosity in the compact and could increase working voltages of the capacitor by cleaning the tantalum particle surfaces and removing trace elements.

It is well known that metals are difficult to heat directly with microwave power because at room temperature their electrical conductivity is so high that the microwave energy is reflected and not absorbed To achieve such absorption of energy, various insulation or "casketing" techniques have been developed (C. E. Holcombe and N. L. Dykes, Importance of Casketing for Microwave Sintering of Materials, J. Mat. Sci. Lett. 9, 425-8, 1990) to provide a combination of direct and indirect microwave heating. By the appropriate casketing technique, tantalum compacts can easily be heated to a suitable sintering temperature. Additional unexpected benefits are achieved as will be described below.

SUMMARY OF INVENTION

The principle object of the present invention is the provision of superior quality sintered tantalum powder compacts having maximal surface area and a resulting tantalum capacitor anode with uniquely high surface area and low surface impurities. Further and other objects of the present invention will become apparent from the description contained herein.

The principle object of invention is achieved by cold-pressing a mixture of tantalum powder, organic binders and lubricants to form a porous compact; microwave sintering the porous compact to further densify the compact and to remove the binders and lubricants; anodizing the compact to form a dielectric oxide layer on the tantalum surfaces; infiltrating the compact with a conductive material; attaching leads to the compact to form a capacitor; and hermetically sealing the capacitor.

DESCRIPTION OF PREFERRED EMBODIMENT

Figure 1:
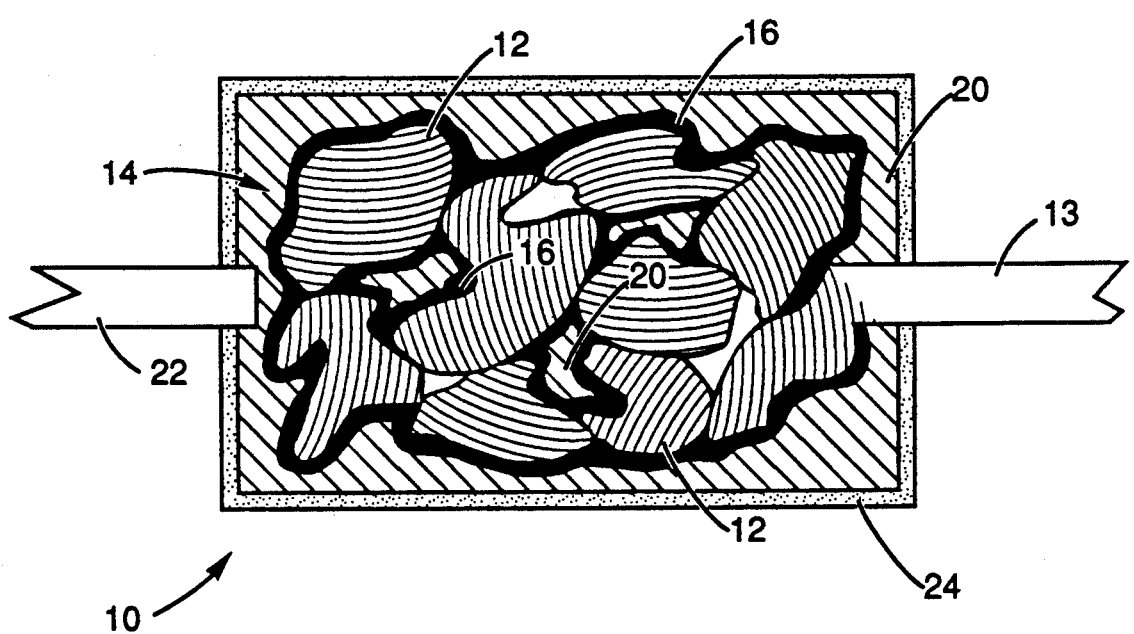
FIG. 1 schematically illustrates a capacitor formed from a microwave sintered tantalum compact according to the teachings of the preferred embodiment of invention.
Figure 2:
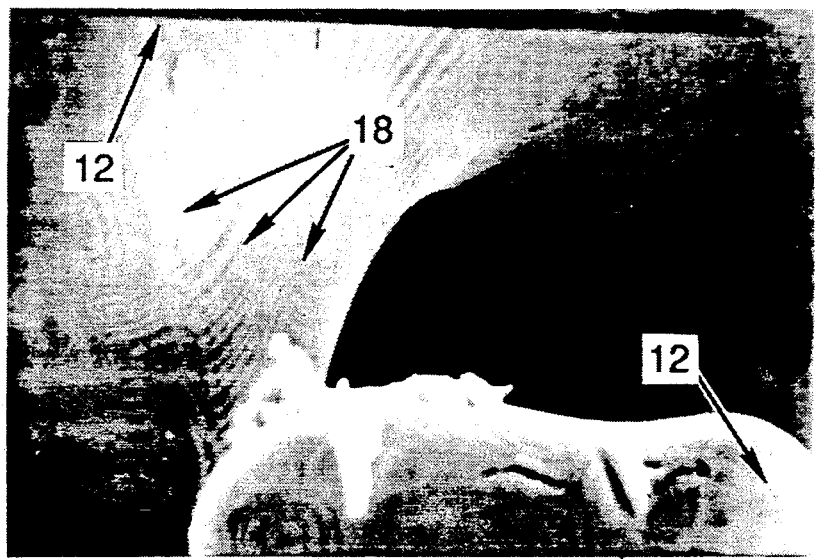
FIG. 2 is a 10,000× scanning electron micrograph of a tantalum compact sintered according to the teachings of the invention showing the rippled surface of the tantalum particles resulting from microwave sintering.

The present invention provides a novel tantalum capacitor 10 and a novel process for obtaining such a capacitor 10 by sintering a tantalum compact in a vacuum or inert atmosphere with the application of radio frequency(rf) or microwave energy. Departure from conventional techniques for making tantalum capacitors occurs when preparing the tantalum capacitor anodes by a radio frequency or microwave frequency sintering process. Referring to FIG. 1, the novel tantalum anodes are made by cold-pressing a mixture of tantalum powder particles 12 and small amounts of organic binders and lubricants to form a porous compact 14. The compact 14 is then placed in a conventional vacuum furnace and heated to remove the binders and lubricants. An insulating material (not shown) that has a relatively low thermal conductivity and relatively high loss factor at room temperature is then used to surround the compacts for enhancing coupling between the rf or microwave energy and the compact 14. Said powder compact 14 surrounded by said insulating material is then exposed to rf or microwave power at fixed or varying frequency to heat the entire assemblage to high temperature, e.g. 1600° C. to 1900° C. for approximately thirty minutes to create an arc or plasma where the powder particles 12 are in contact to complete the sintering process. A first electrical lead 13 is then electrically connected to the compact 14. The compact 14 is then anodized by conventional techniques to form a tantalum oxide (Ta2O5) layer 16 on the exposed tantalum surfaces. FIG. 2 illustrates the unique rippling 18 of the tantalum surface achieved by sintering in this manner which greatly increases the surface area of the compact 14 and hence the capacitance of the subsequently formed capacitor 10.

The compact is then infiltrated with a suitable conductive electrode material 20 such as manganese dioxide(MnO2); a second wire lead 22 is attached via a cap (not shown) that steps over the conductive electrode material 20 to form a capacitor 10; and the capacitor 10 is then hermetically sealed with a protective coating 24. Two specific process examples of tantalum compacts prepared according to the teachings of the invention are given below:

EXAMPLE I

Cold-pressed tantalum compacts were prepared from sodium-reduced powder. Binders and lubricants were removed by heating 30 min in vacuum at 480° C. The parts were then surrounded by a mixture of zirconia bubbles and zirconia fiber and sintered, in a microwave furnace at 1300°-1425° C. for 2 min in a vacuum of about 60 mT. Some sintering was observed even though the temperature and time were much less than those used in conventional processes, e.g. three hours or more.

EXAMPLE II

Tantalum compacts were prepared as in Example I. The parts were surrounded by a 50:50 mixture of zirconia fiber and yttria grit and sintered in vacuum in a microwave furnace for 30 min at 1700° C. Excellent sintering was observed. A new, hitherto unreported phenomenon was also observed in these samples, namely, microscopic surface ripples on the tantalum particles. The ripples indicate that a microscopic arc or plasma was created in the pore spaces between the tantalum grains. This effect not only assists the sintering process but also removes harmful impurity atoms that might have diffused to the particle surfaces either during powder formation or during sintering.

Other examples of the novel sintering process and the novel tantalum compacts and capacitors formed thereby have been documented and the general range of the sintering process conditions under which the novel tantalum compacts were formed is shown below:

Insulating material: Y2O3 powder, Al2O3 brick, ZrO2 bubbles, or ZrO2 bubbles and ZrO2 fiber
Temperature: 1300° to 1700° C.
Time: 30 to 32 minutes
Sintering atmosphere: vacuum or inert gas
Microwave frequency: approximately 2.45 GHz Although the teachings describe the preferred embodiment of the invention, it is apparent to those skilled in the art that various changes and modifications can be made thereto without departing from the scope of the appended claims defining the subject invention.

We claim:

1. A process for manufacturing a tantalum capacitor comprising:
providing a mixture comprising particles of tantalum powder, a binder, and a lubricant;
cold-pressing said mixture to form a plurality of porous compacts;
removing said binders and lubricants from the compacts by heating in a vacuum;
surrounding the compacts with a low-density refractory insulation;
heating the compacts and the refractory insulation in a controlled atmosphere by applying electromagnetic radiation;
anodizing the compacts to form a continuous tantalum oxide layer on their exposed surface area;
infiltrating the anodized compacts with a conductive phase material;
attaching wire leads to the infiltrated compacts to form an electrical capacitor; and
sealing said capacitor hermetically.

2. The process of claim in which said particles of tantalum powder are made by the sodium reduction process.

3. The process of claim 1 in which the particles of tantalum powder are made by electron beam refining.

4. The process of claim 1 in which said controlled atmosphere is a vacuum of 60 millitorr or better.

5. The process of claim 1 in which said controlled atmosphere is an inert gas.

6. The process of claim 5 in which said inert gas is argon.

7. The process of claim 1 in which said refractory insulation is an oxide chosen from the group consisting of zirconium, hafnium, yttrium, titanium and the rare earths.

8. The process of claim 1 in which said electromagnetic radiation is radio frequency radiation.

9. The process of claim 1 in which said electromagnetic radiation is microwave frequency radiation.

10. The process of claim 1 in which the electromagnetic radiation has a variable frequency during the heating process.

11. The process of claim in which the electromagnetic radiation has a constant frequency during the heating process.

12. The process of claim 1 in which the frequency of the electromagnetic radiation is chosen to maximize surface plasma or arcing effects in pore spaces in the porous compact.

13. The process of claim 1 in which the controlled atmosphere has a temperature and pressure chosen to maximize the surface plasma or arcing effects.

14. The process of claim 1 in which the step of removing the binders and lubricants is performed at a temperature of 300° to 600° C.

15. The process of claim 1 in which the step of heating the compacts and refractory insulation is performed at a temperature of 300° to 2000° C.

16. A tantalum capacitor comprising:
a porous tantalum compact having a plurality of pore spaces therein and all exposed tantalum surfaces having ripples therein;
an oxide layer overlaying all said ripples in said surfaces;
a conductive material infiltrating said compact into all said pore spaces and coating said oxide layer;
a pair of metallic leads operatively connected to said compact to form said capacitor; and
a protective coating overlaying said infiltrated compact.

17. The capacitor of claim 16 wherein said oxide is anodically grown tantalum oxide.

18. The capacitor of claim 16 wherein said conductive material is manganese dioxide.

* * * * *